March 27, 1962   S. H. AULD, JR   3,027,505
MOTOR CONTROL HAVING RATE FEEDBACK
Filed July 27, 1959   2 Sheets-Sheet 1

INVENTOR.
SAMUEL H. AULD, JR.

BY Harold J. Downes
ATTORNEY

INVENTOR.
SAMUEL H. AULD, JR.
BY Harold J. Downes
ATTORNEY

United States Patent Office 3,027,505
Patented Mar. 27, 1962

3,027,505
MOTOR CONTROL HAVING RATE FEEDBACK
Samuel H. Auld, Jr., Canoga Park, Calif., assignor to Lear, Incorporated
Filed July 27, 1959, Ser. No. 829,804
2 Claims. (Cl. 318—331)

This invention relates to a servo system and, in particular, to a device for achieving a rate of shaft rotation in response to an electrical signal.

In order to effect closed loop servo operation of a motor, for example, it has been conventional practice in the past to amplify the command signal, drive the servo motor with the amplified electrical signal, attach a rate pickoff, such as a small electrical generator to the output shaft of the motor, and feed back to the input of the amplifier some or all of the output of the generator so that when the motor has reached a speed corresponding to the input signal, the motor ceases to be further energized.

This invention contemplates a system for utilizing the motor itself as the source of feedback voltage by using the motor, first, as a motor and then as a generator by serial time sharing. When the motor is being used as a generator, its output is switched to the input of the amplifier by suitable circuitry and is disconnected from the output of the amplifier. When it is used as a motor, it is disconnected from the input of the amplifier but is connected directly to the output of the amplifier. The switching is done rapidly and continuously. The motor may be a D.C. motor or an A.C. motor. The circuitry for performing the switching and feedback is somewhat different, depending on the type of motor. However, as will become apparent herein, the motor, and hence its load, is caused to be driven in a direction and speed in accordance respectively with the sense (i.e. polarity or phase) and amplitude (i.e. voltage) of an electrical signal without the use of a separately generated feedback signal.

It is an object of this invention to provide a simplified rate servo.

It is another object of this invention to provide novel means for causing a shaft to rotate with a speed and direction corresponding to the magnitude phase of an alternating signal.

It is another object of this invention to provide a rate servo in which the electric motor is used to sense its own rate.

It is another object of this invention to provide a rate servo in which the back E.M.F. of the motor is utilized as a feedback signal.

Other objects of invention will become apparent from the following description taken in connection with the accompanying drawings, in which FIG. 1 is a block diagram of the invention;

Figure 2:
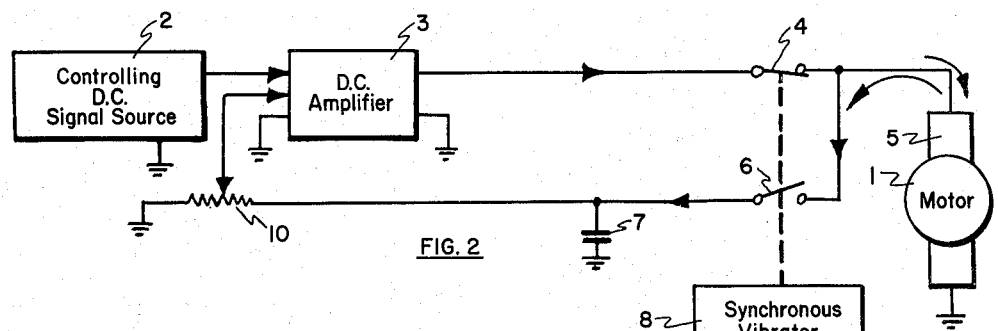
FIG. 2 is a block diagram of a modified form of the invention.

Referring now to FIG. 2, there is shown what is perhaps the simplest form of the invention. In FIG. 2 it is desired that motor 1 rotate at a rate and in a direction corresponding to the magnitude and polarity of a direct current signal from source 2. Accordingly, the signal from source 2 is fed to the input of D.C. amplifier 3 whose output is connected through switch 4 to one terminal of motor 1. One terminal of motor 1 is grounded. Terminal 5 is connected to switch 6 which in turn is connected to capacitor 7 and the input of amplifier 3, as shown. Capacitor 7 is also grounded. Switches 4 and 6 are mechanically driven together by synchronous vibrator 8 which is powered by a source of constant frequency alternating current 9. Switches 4 and 6 are arranged so that when switch 4 is closed, switch 6 is open, and when switch 6 is closed, switch 4 is open. With the switches in the positions shown in FIG. 2, current flows from the output of amplifier 3 through switch 4 to motor 1, and the motor turns. At this time, switch 6 is open and no current flows in the feedback circuit. When switch 4 opens on the next half-cycle of reference alternating current source 9, switch 6 closes. The motor is still turning due to its inertia and that of the load. Hence, it acts as a generator, i.e., its back E.M.F. is permitted to flow through switch 6 to one terminal of capacitor 7 and to the input of amplifier 3. Since, in effect, the back E.M.F. of the motor is being sampled, the signal fed through switch 6 and to the input of amplifier 3 is proportioned to the speed of the motor. If we assume that amplifier 3 is one which has an odd number of stages such that a positive-going input signal produces a negative-going output signal, and vice versa, the effect of feedback through switch 6 to the input of amplifier 3 will be in a sense to reduce the net input to the amplifier. In other words, if the controlling D.C. signal from source 2 is a plus voltage, the output of amplifier 3 will be a negative voltage, the motor will turn, and when switch 4 is disconnected and switch 6 is connected, terminal 5 will feed a negative voltage back to the input of amplifier 3. The necessary feedback result is therefore achieved, and after a few cycles of operation of synchronous vibrator 8, the motor turns at the rate commanded by the output of signal source 2. The function of capacitor 7 is to smooth the input to amplifier 3 by storing a charge when switch 6 is closed, and discharging into the input of the amplifier when it is open. The amount of feedback introduced in the input of amplifier 3 may be adjusted by means of a potentiometer 10 connected as shown between switch 6 and the input of amplifier 3.

Figure 3:
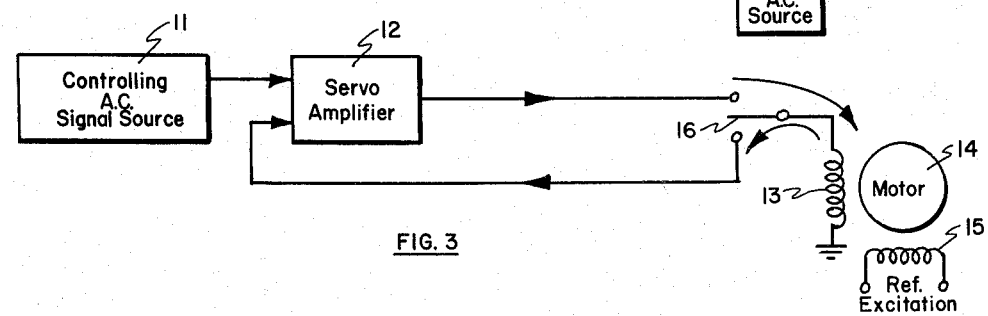
FIG. 3 is a block diagram of a third embodiment of the invention.

Turning now to FIG. 3, there is shown a schematic of the invention as it is applied to the driving of an alternating current motor commonly used in alternating current servos in which the controlling signal is a constant frequency A.C. signal and where the motor is desired to turn in a direction corresponding to the phase lead or lag of the controlling signal with respect to a reference alternating current signal and with a speed corresponding to the amplitude of the controlling signal. For simplicity, the switch 16 in FIG. 3 has been shown schematically, it being understood it is driven in the same manner as in FIG. 2 by the reference alternating current source. In FIG. 3, source 11 furnishes a control signal to amplifier 12 which in turn is connected to the control winding 13 of two-phase A.C. motor 14 to which reference alternating current excitation is also furnished by way of reference stator winding 15. Synchronously-driven switch 16 provides the connection between the output of amplifier 12 and winding 13, and between winding 13 and the input of amplifier 12 in alternating fashion similar to that shown in FIG. 2.

Again, as in the embodiment of the device shown in FIG. 2, during alternate half-cycles of the reference alternating current, the motor functions either as motor or as generator, and the effect is to feed back to the input of amplifier 12 a periodic sample of the back E.M.F. of the motor which is an example of its speed. As in the device shown in FIG. 2, the amount of feedback may be adjusted by the use of a potentiometer (not shown), or any other suitable device.

In some cases, as in certain aircraft applications, it may be desirable to utilize a D.C. motor with a phase sensitive A.C. signal source. A schematic of the present invention applied to this requirement is set forth in FIG. 1. In those cases where it is mandatory to use a direct current motor, one may by the use of the circuitry shown schematically in FIG. 1 and in detail in FIG. 4, utilize alternating current amplifiers and other circuitry of conventional and compact design and avoid the use of D.C. amplifiers whose tendency to drift is well known.

Figure 1:
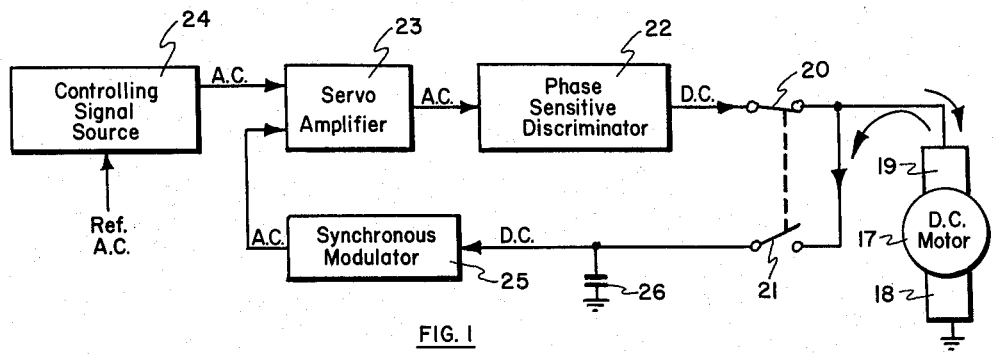

In FIG. 1, D.C. motor 17 is connected by one terminal 18 to ground, and by terminal 19 to terminals of switches 20 and 21. Switch 20 receives the output of phase-sensitive discriminator 22 which in turn is connected to the output of servo amplifier 23. Servo amplifier 23 receives as its inputs an alternating current signal from the controlling signal source 24 and the outputs of synchronous modulator 25 whose input is derived from switch 21 via capacitor 26.

In the embodiment of the invention shown in FIG. 1, the controlling signal is in the form of an alternating current signal which is either in phase with a reference alternating current signal of the same frequency, or out of phase therewith. The amplitude of the signal may also vary. It is generally desired that motor 17 turn in a direction corresponding to the phase of the controlling signal (i.e. clockwise or counterclockwise) and with a speed corresponding to the amplitude of the controlling signal. The same reference alternating current signal is furnished to control a signal source 24, phase sensitive discriminator 22 and the synchronous drive which actuates switches 20 and 21. Accordingly, on alternate half cycles of the reference alternating current signal, switches 20 and 21 are alternately closed and opened, as in previous examples. When switch 21 is closed, since motor 17 is a D.C. motor, a D.C. signal is fed to modulator 25 by capacitor 26. As in the device shown in FIG. 2, the function of capacitor 26 is to smooth the input to the synchronous modulator from a chopped direct current signal to a virtually continuous signal. The output of synchronous modulator 25 is an alternating current signal having the same frequency as the reference alternating current signal but with a phase and amplitude corresponding to the speed of motor 17. This signal combines at the input to servo amplifier 23 with the controlling signal from controlling signal source 24 but in opposition thereto. Thus, as motor 17 reaches the speed commanded by the controlling signal source, the input to servo amplifier 23 drops to zero to maintain the speed of motor 17 at the speed commanded.

Figure 4:
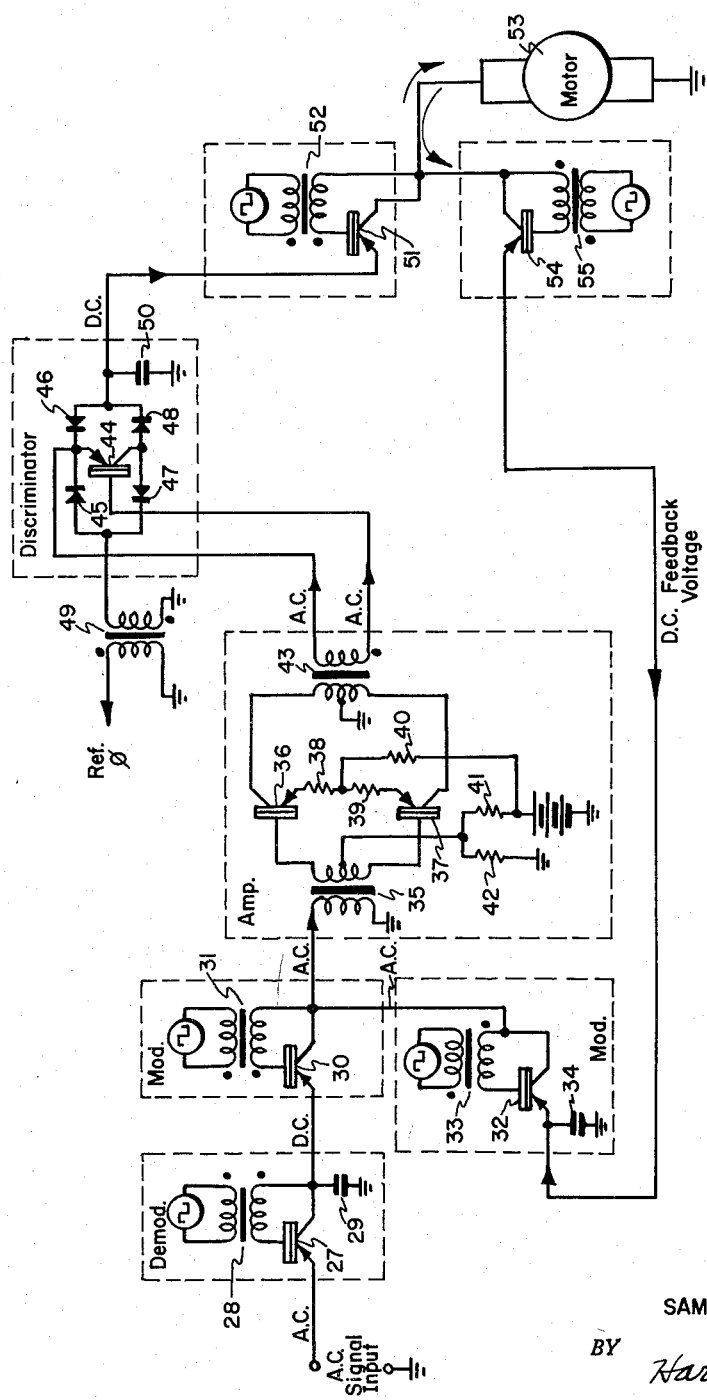
FIG. 4 is a detailed circuit diagram of the device shown in FIG. 1.

A detailed circuit diagram of the system of this invention, particularly as embodied in FIG. 1, is shown in FIG. 4. As can be seen in FIG. 4, the basic system is that required to drive a D.C. motor with a phase-reversible, alternating current control signal. Accordingly, the input signal is applied to the emitter of a transistor 27 whose collector and base are connected to the secondary of the transformer 28, as shown. The primary of the transformer is connected to the reference alternating current. The collector is also connected to a capacitor 29, which is also connected to ground. The function of the transistor-transformer-capacitor combination, as shown, is that of a demodulator and its output is a direct current signal of sign corresponding to the phase of the input alternating current signal with respect to the reference alternating current signal, and of amplitude corresponding to the amplitude of the alternating current input. The output of this demodulator circuit is fed to the input of a modulator circuit comprised of transistor 30 and transformer 31. The feedback voltage from the motor is applied to the emitter of transistor 32, which is connected to transformer 33 and capacitor 34, as shown, to form a modulator for the direct current feedback voltage. The output of this modulator and that of which transistor 30 is comprised are together fed to the primary of transformer 35 which is the input stage to an amplifier consisting of transistors 36 and 37, resistors 38, 39, 40, 41 and 42, the output of which is fed to the primary of transformer 43. The secondary of transformer 43 is fed to a discriminator circuit comprised of transistor 44, diodes 45, 46, 47 and 48, and transformer 49 and capacitor 50. The output of this discriminator is a direct current signal which is fed to a transistor switch corresponding to switch 4 of FIG. 2, the switch being comprised of transistor 51 and transformer 52. The output of this switch is connected to one terminal of direct current motor 53, while the other terminal thereof is connected to ground. Another transistor switch comprised of transistor 54 and transformer 55 is also connected to the ungrounded terminal of motor 53 to take feedback voltage from the motor to the emitter of transistor 32. Transformer 28, 31, 33, 49, 52 and 55 all have applied to their primary windings the reference alternating current which also forms the reference for the alternating current signal input.

During alternate half cycles of the reference frequency, transistors 51 and 54 operate effectively to open or close a switch in precisely the same manner as in FIGS. 1 and 2. To avoid otherwise compensating for the variation and level from the feedback voltage directly from the motor and the level of the signal input, the disparity between which may in some cases be large, a separate modulator for the feedback voltage and for the input signal is provided. If the level of the two signals is comparable, it would be possible to eliminate one or the other of the modulators of which transistors 30 and 32 are comprised.

It should be noted that all of the reference phase alternating current shown supplied to the system shown in FIGURE 4 is from a common constant frequency source so that all reference phase alternating current is in phase. Furthermore, all of the reference phase alternating current is square wave except that supplied to the discriminator. If the reference phase alternating current is not square wave, the switching action does not occur as precisely in synchronism as may be desirable; however, the devices of this invention function satisfactorily with either a square or sine wave reference.

Assuming that the alternating current signal input transistor 27 is in phase with the reference alternating current signal and that we are first considering the positive going half cycle of the signals, the input signal charges capacitor 29. During the next or negative going half cycle transistor 30 conducts applying a signal to the input to the amplifier. The output of the amplifier triggers transistor 44 charging capacitor 50. During this same negative going half cycle transistor 51 conducts to permit the positive charge on capacitor 50 to be applied to the motor. Motor 53 then turns generating a positive back E.M.F. Transistor 54 does not conduct.

During the next positive going half cycle of the signal input, transistor 54 conducts and transistor 51 is cut off. The back E.M.F. from the motor is fed to capacitor 34 for smoothing and on through transistor 32 which is then conducting to input of the amplifier.

Thus it can be seen, that during positive going half cycles of the signal input the back E.M.F. of the motor is applied to the input to the amplifier and during negative going half cycles of the signal input, the signal itself is applied to the input to the amplifier and since the amplifier is an alternating current amplifier, the net output of the amplifier for the condition where the signal input is in phase with the reference A.C. is zero. In other words, since transformer 35 responds only to alternating current signals it makes no response if, during succeeding consecutive half cycles, it receives only positive going pulses. If therefore, the signal input is in phase with the reference A.C., there is no change in the velocity of the motor to the extent that the signal input and reference alternating current are out of phase; however, a signal input is received by the amplifier and the motor velocity is corrected to correspond to the signal input.

Finally, it may be observed that in all of the embodiments of the invention a signal is applied to the input of the amplifier which is proportional to the reverse electromotive force or back E.M.F. of the motor as measured during the periods when the motor is disconnected from the output of the amplifier. In some cases the actual back E.M.F. is used as the rate feedback; in others a signal proportional thereto is employed.

Although the invention has been described and illustrated in detail the spirit and scope of the invention are limited only by the terms of the appended claims.

I claim:

1. Means for rotating an output shaft of a motor at a rate and in a direction corresponding to the magnitude and sense of an electrical signal comprising an alternating current electrical input signal, demodulating means for demodulating said reference signal, the output of said demodulating means being a direct current electrical signal having a polarity corresponding to the place of said reference signal and an amplitude corresponding to the amplitude of said reference signal, first modulating means electrically connected and responsive to the output of said demodulating means, the output of said first modulating means being an alternating current electrical signal corresponding in phase to the polarity of said direct current electrical signal and in amplitude to the amplitude of said direct current electrical signal, amplifier means connected and responsive to the output of said modulating means, discriminator means electrically connected and responsive to the output of said amplifier, first transistor switching means connected and responsive to the output of said discriminator means, a direct current motor having a first pole grounded and a second pole electrically connected to said first transistor switching means, second transistor switching means electrically connected to said second pole for sampling the direct current back electromotive force of said motor, second modulating means electrically connected and responsive to the output of said second switching means, the output of said second modulating means being an alternating current electrical signal corresponding in phase to the polarity of said direct current output of said motor and in amplitude to the amplitude of said direct current output of said motor, circuit means for adding the output of said second modulating means to the output of said first modulating means so that the input to said amplifier is the sum of the electrical outputs of said first and second modulating means, and means for rendering said first and second transistor switches alternately conducting to first cause said motor to be driven by said output of said discriminator and then to cause the back electromotive force of said motor to be sampled and transmitted to the input of said second modulator.

2. The device as claimed in claim 1 and further comprising an alternating current square wave reference signal electrically connected to activate said demodulator, first and second modulators, discriminator and said first and second switches.

References Cited in the file of this patent

UNITED STATES PATENTS 2,905,876   Hillman _____ Sept. 22, 1959